United States Patent
Owen et al.

(10) Patent No.: US 10,999,282 B2
(45) Date of Patent: *May 4, 2021

(54) SYSTEM AND METHOD FOR SECURE CONTROL OF RESOURCES OF WIRELESS MOBILE COMMUNICATION DEVICES

(71) Applicant: BlackBerry Limited, Waterloo (CA)

(72) Inventors: Russell Norman Owen, Waterloo (CA); Michael Shenfield, Richmond Hill (CA); Herbert Anthony Little, Waterloo (CA); David Paul Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 182 days.

This patent is subject to a terminal disclaimer.

(21) Appl. No.: 16/415,702

(22) Filed: May 17, 2019

(65) Prior Publication Data

US 2019/0273742 A1    Sep. 5, 2019

Related U.S. Application Data

(63) Continuation of application No. 16/025,583, filed on Jul. 2, 2018, now Pat. No. 10,298,584, which is a
(Continued)

(51) Int. Cl.
*H04L 29/06* (2006.01)
*H04W 12/086* (2021.01)
(Continued)

(52) U.S. Cl.
CPC .......... *H04L 63/10* (2013.01); *G06F 21/6245* (2013.01); *H04L 63/0428* (2013.01);
(Continued)

(58) Field of Classification Search
CPC ..... H04L 63/10; H04L 63/20; H04L 63/0442; H04L 63/102; H04L 63/12;
(Continued)

(56) References Cited

U.S. PATENT DOCUMENTS

| 4,945,556 | A | 7/1990 | Namekawa |
| 5,204,961 | A | 4/1993 | Barlow |

(Continued)

FOREIGN PATENT DOCUMENTS

| CA | 2757815 A1 | 5/2012 |
| CN | 101523878 A | 9/2009 |

(Continued)

OTHER PUBLICATIONS

Newton, Harry; "Newton's Telecom Dictionary;" CMP Books; 22nd Edition; 2006; 4 pages.
(Continued)

*Primary Examiner* — Darren B Schwartz
(74) *Attorney, Agent, or Firm* — Conley Rose, P.C.; J. Robert Brown, Jr.; Gayatry S. Nair

(57) ABSTRACT

Systems and methods for secure control of a wireless mobile communication device are disclosed. Each of a plurality of domains includes at least one wireless mobile communication device asset. When a request to perform an operation affecting at least one of the assets is received, it is determined whether the request is permitted by the domain that includes the at least one affected asset, by determining whether the entity with which the request originated has a trust relationship with the domain, for example. The operation is completed where it is permitted by the domain. Wireless mobile communication device assets include software applications, persistent data, communication pipes, and configuration data, properties or user or subscriber profiles.

29 Claims, 5 Drawing Sheets

Related U.S. Application Data continuation of application No. 15/207,125, filed on Jul. 11, 2016, now Pat. No. 10,015,168, which is a continuation of application No. 14/543,324, filed on Nov. 17, 2014, now Pat. No. 9,391,992, which is a continuation of application No. 14/188,345, filed on Feb. 24, 2014, now Pat. No. 8,893,266, which is a continuation of application No. 13/371,093, filed on Feb. 10, 2012, now Pat. No. 8,661,531, which is a continuation of application No. 10/524,353, filed as application No. PCT/CA03/01245 on Aug. 19, 2003, now Pat. No. 8,544,084.

(60) Provisional application No. 60/404,120, filed on Aug. 19, 2002.

(51) Int. Cl.
G06F 21/62 (2013.01)
H04W 12/08 (2021.01)

(52) U.S. Cl.
CPC ........ *H04L 63/0442* (2013.01); *H04L 63/102* (2013.01); *H04L 63/104* (2013.01); *H04L 63/12* (2013.01); *H04L 63/20* (2013.01); *H04W 12/08* (2013.01); *H04W 12/086* (2021.01)

(58) Field of Classification Search
CPC ............. H04L 63/0428; H04L 63/104; H04W 12/086; H04W 12/08; G06F 21/6245
See application file for complete search history.

(56) References Cited

U.S. PATENT DOCUMENTS

| | | |
|---|---|---|
| 5,220,604 A | 6/1993 | Gasser et al. |
| 5,432,934 A | 7/1995 | Levin et al. |
| 5,649,194 A | 7/1997 | Miller et al. |
| 5,708,812 A | 1/1998 | Van Dyke et al. |
| 5,768,519 A | 6/1998 | Swift et al. |
| 5,845,068 A | 12/1998 | Winiger |
| 5,864,765 A | 1/1999 | Barvesten |
| 5,987,440 A | 11/1999 | O'Neil et al. |
| 5,987,611 A | 11/1999 | Freund |
| 6,005,942 A | 12/1999 | Chan et al. |
| 6,044,467 A | 3/2000 | Gong |
| 6,052,735 A | 4/2000 | Ulrich et al. |
| 6,070,244 A | 5/2000 | Orchier et al. |
| 6,081,898 A | 6/2000 | Miller et al. |
| 6,105,132 A | 8/2000 | Fritch et al. |
| 6,173,404 B1 | 1/2001 | Colburn et al. |
| 6,178,505 B1 | 1/2001 | Schneider et al. |
| 6,223,291 B1 | 4/2001 | Puhl et al. |
| 6,233,446 B1 | 5/2001 | Do |
| 6,271,845 B1* | 8/2001 | Richardson ......... H04L 41/0893 715/764 |
| 6,289,458 B1 | 9/2001 | Garg et al. |
| 6,292,798 B1 | 9/2001 | Dockter et al. |
| 6,292,900 B1 | 9/2001 | Ngo et al. |
| 6,321,334 B1 | 11/2001 | Jerger et al. |
| 6,324,645 B1 | 11/2001 | Andrews et al. |
| 6,339,423 B1 | 1/2002 | Sampson et al. |
| 6,345,361 B1 | 2/2002 | Jerger et al. |
| 6,351,816 B1 | 2/2002 | Mueller et al. |
| 6,360,322 B1 | 3/2002 | Grawrock |
| 6,374,292 B1 | 4/2002 | Srivastava et al. |
| 6,393,569 B1 | 5/2002 | Orenshteyn |
| 6,405,202 B1 | 6/2002 | Britton et al. |
| 6,412,070 B1 | 6/2002 | Van Dyke et al. |
| 6,418,466 B1* | 7/2002 | Bertram ................. G06F 21/41 380/255 |
| 6,466,932 B1 | 10/2002 | Dennis et al. |
| 6,516,421 B1 | 2/2003 | Peters |
| 6,594,671 B1 | 7/2003 | Aman et al. |
| 6,625,603 B1 | 9/2003 | Garg et al. |
| 6,647,388 B2 | 11/2003 | Numao et al. |
| 6,668,323 B1 | 12/2003 | Challener et al. |
| 6,757,821 B1 | 6/2004 | Akiyama et al. |
| 6,772,350 B1 | 8/2004 | Belani et al. |
| 6,775,536 B1 | 8/2004 | Geiger et al. |
| 6,785,810 B1 | 8/2004 | Lirov et al. |
| 6,886,038 B1 | 4/2005 | Tabbara et al. |
| 6,957,330 B1 | 10/2005 | Hughes |
| 6,978,385 B1 | 12/2005 | Cheston et al. |
| 7,117,359 B2 | 10/2006 | Wood et al. |
| 7,167,983 B1* | 1/2007 | Tiller ..................... G06Q 10/06 713/166 |
| 7,185,192 B1 | 2/2007 | Kahn |
| 7,185,359 B2 | 2/2007 | Schmidt et al. |
| 7,200,869 B1 | 4/2007 | Hacherl et al. |
| 7,246,374 B1 | 7/2007 | Simon et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,856,654 B2 | 12/2010 | Pouliot |
| 7,869,789 B2 | 1/2011 | Hassan et al. |
| 7,926,086 B1 | 4/2011 | Violleau et al. |
| 8,074,078 B2 | 12/2011 | Brown et al. |
| 8,510,818 B2 | 8/2013 | Garg et al. |
| 8,544,084 B2 | 9/2013 | Owen et al. |
| 8,661,531 B2 | 2/2014 | Owen et al. |
| 8,893,266 B2 | 11/2014 | Owen et al. |
| 9,147,085 B2 | 9/2015 | Bender et al. |
| 9,225,727 B2 | 12/2015 | Bender et al. |
| 9,391,992 B2 | 7/2016 | Owen et al. |
| 9,998,466 B2 | 6/2018 | Owen et al. |
| 10,015,168 B2 | 7/2018 | Owen et al. |
| 10,296,755 B2 | 5/2019 | Bender et al. |
| 10,298,584 B2 | 5/2019 | Owen et al. |
| 2001/0023421 A1 | 9/2001 | Numao et al. |
| 2001/0047485 A1 | 11/2001 | Brown et al. |
| 2002/0019944 A1 | 2/2002 | Kou |
| 2002/0031230 A1 | 3/2002 | Sweet et al. |
| 2002/0049603 A1* | 4/2002 | Mehra ..................... G06F 9/465 726/3 |
| 2002/0054101 A1* | 5/2002 | Beatty ................... G06Q 10/06 715/764 |
| 2002/0083341 A1 | 6/2002 | Feuerstein et al. |
| 2002/0095414 A1 | 7/2002 | Barnett et al. |
| 2002/0095497 A1 | 7/2002 | Satagopan et al. |
| 2002/0099837 A1 | 7/2002 | Oe et al. |
| 2002/0099952 A1 | 7/2002 | Lambert et al. |
| 2002/0112155 A1 | 8/2002 | Martherus et al. |
| 2002/0143944 A1 | 10/2002 | Traversat et al. |
| 2002/0147801 A1 | 10/2002 | Gullotta et al. |
| 2002/0162021 A1 | 10/2002 | Audebert et al. |
| 2002/0169986 A1 | 11/2002 | Lortz |
| 2002/0194482 A1 | 12/2002 | Griffin et al. |
| 2002/0194493 A1 | 12/2002 | Dalton |
| 2003/0005290 A1 | 1/2003 | Fishman et al. |
| 2003/0005317 A1 | 1/2003 | Audebert et al. |
| 2003/0014466 A1 | 1/2003 | Berger et al. |
| 2003/0014509 A1* | 1/2003 | Jurado, Jr. ............... H04L 67/02 709/223 |
| 2003/0028493 A1 | 2/2003 | Tajima et al. |
| 2003/0061323 A1* | 3/2003 | East ........................ H04L 41/22 709/223 |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126215 A1 | 7/2003 | Udell et al. |
| 2003/0126437 A1 | 7/2003 | Wheeler et al. |
| 2003/0135611 A1* | 7/2003 | Kemp ..................... H04L 41/22 709/224 |
| 2003/0163685 A1 | 8/2003 | Paatero |
| 2003/0167399 A1 | 9/2003 | Audebert et al. |
| 2003/0177389 A1 | 9/2003 | Albert et al. |
| 2003/0204740 A1 | 10/2003 | Shapiro et al. |
| 2004/0001101 A1 | 1/2004 | Trajkovic et al. |
| 2004/0003112 A1 | 1/2004 | Alles et al. |
| 2004/0088543 A1 | 5/2004 | Garg et al. |

(56) References Cited

U.S. PATENT DOCUMENTS

| | | | |
|---|---|---|---|
| 2004/0122946 A1* | 6/2004 | Hu | H04L 67/2852 709/225 |
| 2004/0123152 A1* | 6/2004 | Le Saint | G07F 7/02 726/9 |
| 2004/0128392 A1 | 7/2004 | Blakley, III et al. | |
| 2004/0128559 A1* | 7/2004 | Zurko | H04L 63/08 726/4 |
| 2004/0148429 A1 | 7/2004 | Audebert et al. | |
| 2004/0260942 A1 | 12/2004 | Jamieson et al. | |
| 2004/0267971 A1 | 12/2004 | Seshadri | |
| 2004/0268254 A1 | 12/2004 | Fujiwara | |
| 2005/0005094 A1 | 1/2005 | Jamieson et al. | |
| 2005/0154935 A1 | 7/2005 | Jin | |
| 2005/0251573 A1 | 11/2005 | Merkow et al. | |
| 2006/0059556 A1 | 3/2006 | Royer | |
| 2006/0070114 A1 | 3/2006 | Wood et al. | |
| 2006/0129948 A1 | 6/2006 | Hamzy et al. | |
| 2006/0156026 A1 | 7/2006 | Utin | |
| 2006/0212589 A1 | 9/2006 | Hayer et al. | |
| 2006/0230041 A1 | 10/2006 | Sherwood | |
| 2007/0073694 A1 | 3/2007 | Picault et al. | |
| 2007/0277127 A1 | 11/2007 | Carlson et al. | |
| 2008/0034402 A1 | 2/2008 | Botz et al. | |
| 2008/0222711 A1 | 9/2008 | Michaelis | |
| 2008/0317012 A1 | 12/2008 | Singh | |
| 2009/0271844 A1 | 10/2009 | Zhang et al. | |
| 2010/0182230 A1 | 7/2010 | Yamada et al. | |
| 2010/0274910 A1 | 10/2010 | Ghanaie-Sichanie et al. | |
| 2010/0319053 A1 | 12/2010 | Gharabally | |
| 2011/0145833 A1 | 6/2011 | De Los Reyes et al. | |
| 2011/0185428 A1 | 7/2011 | Sallam | |
| 2011/0275364 A1 | 11/2011 | Austin et al. | |
| 2011/0314467 A1 | 12/2011 | Pearson | |
| 2012/0054853 A1 | 3/2012 | Gupta et al. | |
| 2012/0079267 A1 | 3/2012 | Lee | |
| 2012/0079609 A1 | 3/2012 | Bender et al. | |
| 2012/0202527 A1 | 8/2012 | Obradovich et al. | |
| 2013/0166595 A1 | 6/2013 | Meketa et al. | |

FOREIGN PATENT DOCUMENTS

| | | |
|---|---|---|
| EP | 0973350 A2 | 1/2000 |
| EP | 2453631 A1 | 5/2012 |
| GB | 2403107 A | 12/2004 |
| WO | 0059225 A1 | 10/2000 |
| WO | 0239237 A2 | 5/2002 |
| WO | 2005045550 A2 | 5/2005 |

OTHER PUBLICATIONS

Menezes, Alfred J., et al.; "Handbook of Applied Cryptography"; CRC Press; 1997; 12 pages.
3GPP TS 23.057 V3.3.0; 3rd Generation Partnership Project; Technical Specification Group Terminals; Mobile Station Application Execution Environment (MExE); Functional Description; Stage 2; Release 1999; Sep. 2000; 60 pages.
Kelley, Diana; "Smartphone Security Beyond Lock and Wipe"; http://www.enterprisemobiletoday.com/features/security/article.php/3887006/Smartphone-Security-Beyond-Lock-and-Wipe.htm; Jun. 10, 2010; 4 pages.
Wikipedia; "Basic Access Authentication"; http://en.wikipedia.org/wiki/Basic_access_authentication; Mar. 20, 2013; 3 pages.
Wikipedia; "Digest Access Authentication"; http://en.wikipedia.org/wiki/Digest_access_authentication; Mar. 4, 2013; 7 pages.
Wikipedia; "Cross-site Request Forgery"; http://en.wikipedia.org/wiki/Cross-site_request_forgery; Mar. 11, 2013; 6 pages.
Korpipaa, Panu, et al.; "Customizing User Interaction in Smart Phones"; Pervasive Computing; IEEE; Jul.-Sep. 2006; 9 pages.
Seifert, Julian, et al.; "Supporting Mobile Privacy and Security Through Sensor-Based Context Detection"; Second International Workshop on Security and Privacy in Spontaneous Interaction and Mobile Phone Use; May 17, 2010; Helsinki, Finland; 2 pages.
Yang, KA, et al.; "Eagle Vision: A Pervasive Mobile Device Protection System"; Iowa State University; Feb. 22, 2011; 10 pages.
Gupta, Aditi, et al.; "Using Context-Profiling to Aid Access Control Decisions in Mobile Devices"; http://www.cerias.purdue.edu/assets/symposium/2011-posters/372-C48.pdf; CERIAS; Purdue University; 2011; 1 page.
Office Action dated May 30, 2008; U.S. Appl. No. 10/524,353, filed Feb. 14, 2005; 9 pages.
Final Office Action dated Dec. 10, 2008; U.S. Appl. No. 10/524,353, filed Feb. 14, 2005; 12 pages.
Advisory Action dated Feb. 18, 2009; U.S. Appl. No. 10/524,353, filed Feb. 14, 2005; 3 pages.
Office Action dated Apr. 8, 2009; U.S. Appl. No. 10/524,353, filed Feb. 14, 2005; 12 pages.
Final Office Action dated Nov. 12, 2009; U.S. Appl. No. 10/524,353, filed Feb. 14, 2005; 12 pages.
Office Action dated Feb. 2, 2010; U.S. Appl. No. 10/524,353, filed Feb. 14, 2005; 13 pages.
Final Office Action dated May 21, 2010; U.S. Appl. No. 10/524,353, filed Feb. 14, 2005; 12 pages.
Advisory Action dated Jul. 23, 2010; U.S. Appl. No. 10/524,353, filed Feb. 14, 2005; 5 pages.
Office Action dated Apr. 29, 2011; U.S. Appl. No. 10/524,353, filed Feb. 14, 2005; 15 pages.
Final Office Action dated Oct. 20, 2011; U.S. Appl. No. 10/524,353, filed Feb. 14, 2005; 14 pages.
Advisory Action dated Jan. 10, 2012; U.S. Appl. No. 10/524,353, filed Feb. 14, 2005; 6 pages.
Office Action dated Sep. 21, 2012; U.S. Appl. No. 10/524,353, filed Feb. 14, 2005; 16 pages.
Notice of Allowance dated Mar. 8, 2013; U.S. Appl. No. 10/524,353, filed Feb. 14, 2005; 14 pages.
Notice of Allowance dated May 29, 2013; U.S. Appl. No. 10/524,353, filed Feb. 14, 2005; 18 pages.
Office Action dated Jan. 14, 2013; U.S. Appl. No. 13/371,093, filed Feb. 10, 2012; 26 pages.
Final Office Action dated Apr. 24, 2013; U.S. Appl. No. 13/371,093, filed Feb. 10, 2012; 33 pages.
Advisory Action dated Sep. 13, 2013; U.S. Appl. No. 13/371,093, filed Feb. 10, 2012; 5 pages.
Notice of Allowance dated Oct. 10, 2013; U.S. Appl. No. 13/371,093, filed Feb. 10, 2012; 12 pages.
Notice of Allowance dated Jul. 8, 2014; U.S. Appl. No. 14/188,345, filed Feb. 24, 2014; 31 pages.
Office Action dated Jul. 31, 2015; U.S. Appl. No. 14/543,324, filed Nov. 17, 2014; 9 pages.
Office Action dated Oct. 19, 2015; U.S. Appl. No. 14/543,324, filed Nov. 17, 2014; 37 pages.
Notice of Allowance dated Mar. 9, 2016; U.S. Appl. No. 14/543,324, filed Nov. 17, 2014; 14 pages.
Notice of Allowance dated Feb. 27, 2018; U.S. Appl. No. 15/207,125, filed Jul. 11, 2016; 42 pages.
Notice of Allowance dated Feb. 9, 2018; U.S. Appl. No. 15/207,140, filed Jul. 11, 2016; 42 pages.
Notice of Allowance dated Jan. 9, 2019; U.S. Appl. No. 16/025,583, filed Jul. 2, 2018; 41 pages.
Office Action dated Nov. 26, 2012; U.S. Appl. No. 13/074,136, filed Mar. 29, 2011; 24 pages.
Final Office Action dated Sep. 25, 2013; U.S. Appl. No. 13/074,136, filed Mar. 29, 2011; 11 pages.
Advisory Action dated Dec. 11, 2013; U.S. Appl. No. 13/074,136, filed Mar. 29, 2011; 5 pages.
Office Action dated Oct. 23, 2014; U.S. Appl. No. 13/074,136, filed Mar. 29, 2011; 17 pages.
Final Office Action dated May 21, 2015; U.S. Appl. No. 13/074,136, filed Mar. 29, 2011; 15 pages.
Notice of Allowance dated Aug. 25, 2015; U.S. Appl. No. 13/074,136, filed Mar. 29, 2011; 11 pages.
Office Action dated Mar. 12, 2018; U.S. Appl. No. 14/980,644, filed Dec. 28, 2015; 37 pages.
Notice of Allowance dated Oct. 12, 2018; U.S. Appl. No. 14/980,644, filed Dec. 28, 2015; 9 pages.

(56) References Cited

OTHER PUBLICATIONS

Extended European Search Report; Application No. 11160321.3; dated Jul. 20, 2011; 5 pages.
Canadian Office Action; Application No. 2,757,815; dated Jan. 23, 2014; 3 pages.
Canadian Office Action; Application No. 2,757,815; dated Sep. 29, 2014; 3 pages.
PCT International Search Report; Application No. PCT/CA03/01245; dated Dec. 23, 2003; 3 pages.
PCT Written Opinion; Application No. PCT/CA03/01245; dated Apr. 23, 2004; 2 pages.
PCT Written Opinion; Application No. PCT/CA03/01245; dated Sep. 20, 2004; 6 pages.
PCT International Preliminary Examination Report; Application No. PCT/CA03/01245; dated Nov. 29, 2004; 8 pages.
Canadian Office Action; Application No. 2,496,165; dated Aug. 11, 2005; 4 pages.
Canadian Office Action; Application No. 2,496,165; dated Jul. 7, 2008; 3 pages.
Canadian Office Action; Application No. 2,496,165; dated Jul. 19, 2010; 2 pages.
Canadian Notice of Allowance; Application 2,496,165; dated Aug. 23, 2011; 1 page.
Canadian Office Action; Application 2,496,165; Jun. 28, 2013; 2 pages.
Chinese Office Action; Application No. 03824087.4; dated Dec. 12, 2008; 24 pages.
Chinese Office Action; Application No. 03824087.4; dated Feb. 5, 2010; 5 pages.
Chinese Notice of Allowance; Application No. 03824087.4; dated Sep. 14, 2010; 6 pages.
European Examination Report; Application No. 03787555.6; dated Dec. 8, 2006; 3 pages.
European Examination Report; Application No. 03787555.6; dated Apr. 29, 2010; 5 pages.
European Intent to Grant; Application No. 03787555.6; dated Oct. 22, 2012; 7 pages.

\* cited by examiner

SYSTEM AND METHOD FOR SECURE CONTROL OF RESOURCES OF WIRELESS MOBILE COMMUNICATION DEVICES

CROSS-REFERENCE TO RELATED APPLICATIONS

This application is a continuation of U.S. patent application Ser. No. 16/025,583 filed on Jul. 2, 2018 by Russell Norman Owen, et al. entitled, "System and Method for Secure Control of Resources of Wireless Mobile Communication Devices", which is a continuation of U.S. Pat. No. 10,015,168 issued on Jul. 3, 2018 entitled, "System and Method for Secure Control of Resources of Wireless Mobile Communication Devices", which is a continuation of U.S. Pat. No. 9,391,992 issued on Jul. 12, 2016 entitled, "System and Method for Secure Control of Resources of Wireless Mobile Communication Devices", which is a continuation of U.S. Pat. No. 8,893,266 issued on Nov. 18, 2014 entitled, "System and Method for Secure Control of Resources of Wireless Mobile Communication Devices", which is a continuation of U.S. Pat. No. 8,661,531, issued on Feb. 25, 2014 entitled, "System and Method for Secure Control of Resources of Wireless Mobile Communication Devices", which is a continuation of U.S. Pat. No. 8,544,084, issued on Sep. 24, 2013 entitled, "System and Method for Secure Control of Resources of Wireless Mobile Communication Devices", which is a National Stage Filing of International Application No. PCT/CA2003/001245 filed Aug. 19, 2003, by Russell N. Owen, et al. entitled, "System and Method for Secure Control of Resources of Wireless Mobile Communication Devices," which claims priority to U.S. Provisional Application No. 60/404,120 filed on Aug. 19, 2002, by Russell N. Owen, et al. entitled, "System and Method for Secure Control of Resources of Wireless Mobile Communication Devices", all of which are incorporated by reference herein as if reproduced in their entirety.

TECHNICAL FIELD

This invention relates generally to wireless mobile communication devices, and in particular to providing security for such devices.

BACKGROUND ART

When personal computers (PCs) were first introduced, one of their greatest appeals was that the machine was controlled by its user. This was in stark contrast to the mainframe model, where multiple users shared a single machine. Resources on a mainframe computer were carefully shared between users by the operating system. On a PC having a single user at any time, this type of partitioning of resources was not necessary. As the PC began to displace the corporate mainframe computer, however, issues of control began to re-emerge. Corporate Information Technology (IT) departments, increasingly saw the desktop PC as part of the corporate infrastructure. This caused tension between an original goal of the PC revolution, that the user controls their own computer, and the new role they played in the corporation. This conflict continues today and is played out on a regular basis in companies around the world.

A similar tension exists with handheld and other portable computers. Such as wireless mobile communication devices. However, the situation with handheld computers is more complex for several reasons. Since handheld computers are becoming relatively inexpensive, many users purchase such devices for personal use. Such user-purchased devices cannot be said to be owned by a corporation of which the user is an employee, but they often come to contain corporate data such as contacts, calendar entries and email. Even when a handheld computer is purchased by a corporate employer and provided to an employee, the handheld computer is likely to be used outside the corporate premises. This may require external access to the corporate infrastructure. Allowing an unsecured device to access the corporate network offers potential for security breaches. Furthermore, when a handheld computer is enabled for wireless communications, a carrier becomes another interested party with respect to the handheld computer. The carrier owns and operates a wireless communication network in which the handheld computer is configured to operate, and therefore may want to exercise control over the traffic on that network. As well, the carrier may wish to add to their revenue by offering additional services to handheld computers. A carrier may thus be at odds with a corporate IT department in regard to handheld computer control, particularly where IT department controls may potentially increase network traffic or affect the carrier's ability to offer these services and thus reduce their revenue.

Therefore, there remains a need for a system and method for secure control of a wireless communication device, which allows each individual stakeholders, including the user, corporate owner or corporate system operator, carrier, and possibly other stakeholders, to control their device assets without affecting the other stakeholders.

DISCLOSURE OF INVENTION

According to an aspect of the invention, a system for secure control of a wireless mobile communication device comprises at least one domain, each domain including an asset of the wireless mobile communication device, and a domain controller configured to receive a request to perform an operation affecting at least one of the assets, to determine whether the request originated with an entity that has a trust relationship with the domain that includes the at least one affected asset, and to permit completion of the operation where the request originated with an entity that has a trust relationship with the domain that includes the at least one affected asset.

In accordance with another aspect of the invention, a method for secure control of a wireless mobile communication device, comprises segregating assets of the wireless mobile communication device into a plurality of domains, each domain including at least one asset of the wireless mobile communication device, receiving a request to perform an operation affecting at least one of the assets, determining whether the operation is permitted by the domain that includes the affected asset, and allowing the operation to be completed where the operation is permitted by the domain that includes the affected asset.

Further features of secure control systems and methods will be described or will become apparent in the course of the following detailed description.

BEST MODE FOR CARRYING OUT THE INVENTION

Figure 1:
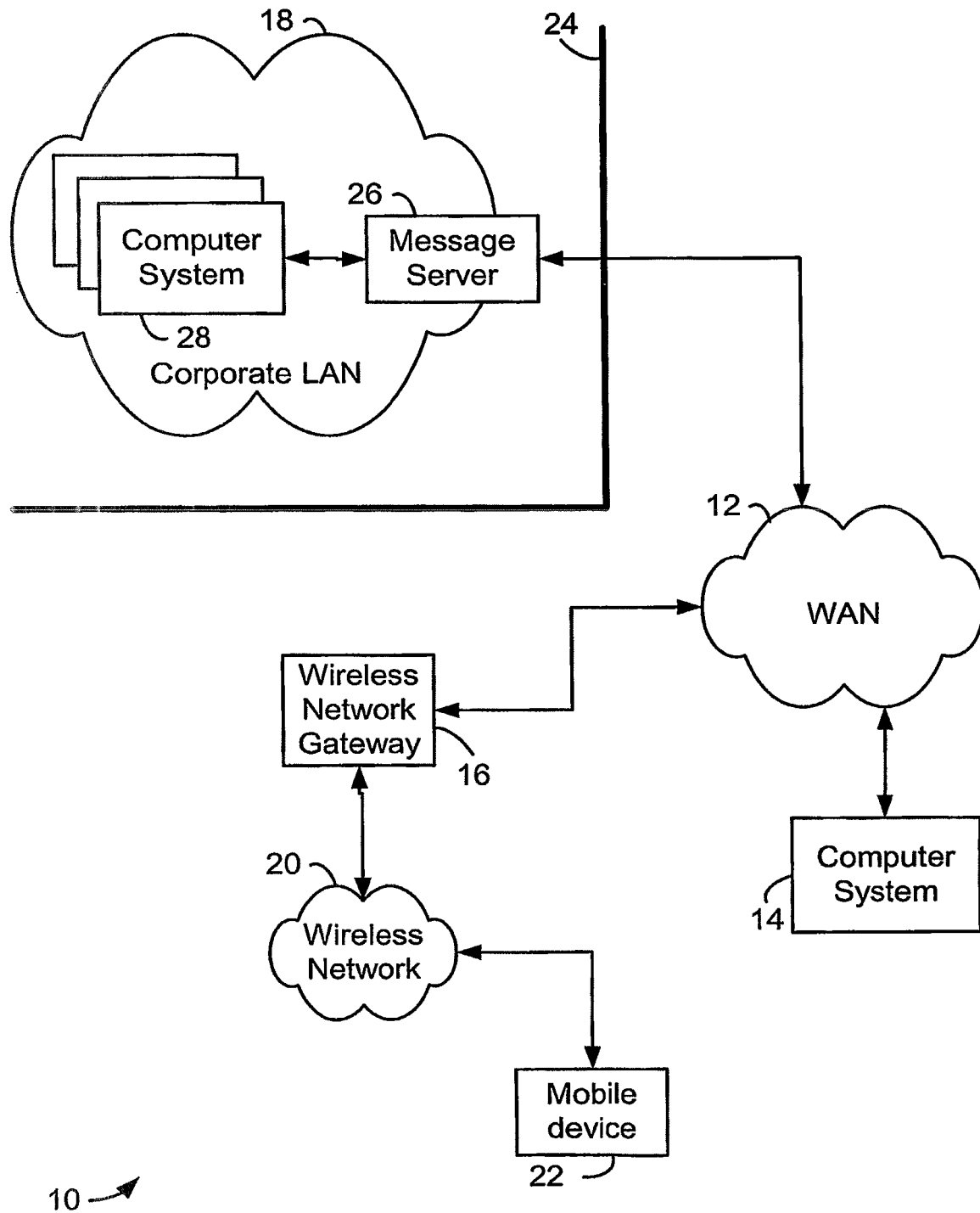
FIG. 1 is a block diagram showing a communication system in which wireless mobile communication devices may be used.

FIG. 1 is a block diagram showing a communication system in which wireless mobile communication devices may be used. The communication system 10 includes a Wide Area Network (WAN) 12, coupled to a computer system 14, a wireless network gateway 16 and a corporate Local Area Network (LAN) 18. The wireless network gateway 16 is also connected to a wireless communication network 20 in which a wireless mobile communication device 22 ("mobile device"), is configured to operate.

The computer system 14 may be a desktop or laptop PC, which is configured to communicate to the WAN 12, the Internet for example. PCs, such as computer system 14, normally access the Internet through an Internet Service Provider (ISP), Application Service Provider (ASP) or the like.

The corporate LAN 18 is an example of a typical working environment, in which multiple computers 28 are connected in a network. It is normally located behind a security firewall 24. Within the corporate LAN 30, a message server 26, operating on a computer behind the firewall 24, acts as the primary interface for the corporation to exchange messages both within the LAN 18, and with other external messaging clients via the WAN 12. Known message servers include, for example, Microsoft™ Exchange Server and Lotus Domino™. These servers are often used in conjunction with Internet mail routers to route and deliver mail. The message server 26 may also provide additional functionality, such as dynamic database storage for data like calendars, todo lists, task lists, e-mail and documentation. Although only a message server 26 is shown in the LAN 18, those skilled in the art will appreciate that a LAN may include other types of servers supporting resources that are shared between the networked computer systems 28. The message server 26 and electronic messaging are described for illustrative purposes only. Owner control systems and methods are applicable to a wide range of electronic devices, and are in no way limited to electronic devices with messaging capabilities.

The message server 26 provides messaging capabilities to networked computer systems 28 coupled to the LAN 18. A typical LAN 18 includes multiple computer systems 28, each of which implements a messaging client, such as Microsoft Outlook™, Lotus Notes™, etc. Within the LAN 18, messages are received by the message server 26, distributed to the appropriate mailboxes for user accounts addressed in the received message, and are then accessed by a user through a messaging client operating on a computer system 28.

The wireless gateway 16 provides an interface to a wireless network 20, through which messages may be exchanged with a mobile device 22. The mobile device 22 may, for example, be a data communication device, a voice communication device, a dual-mode communication device such as many modern cellular telephones having both data and voice communications functionality, a multiple-mode device capable of voice, data and other types of communications, a personal digital assistant (PDA) enabled for wireless communications, or a laptop or desktop computer system with a wireless modem. An exemplary mobile device is described in further detail below.

Such functions as addressing of the mobile device 22, encoding or otherwise transforming messages for wireless transmission, and any other interface functions may be performed by the wireless gateway 16. The wireless gateway 16 may be configured to operate with more than one wireless network 20, in which case the wireless gateway 16 may also determine a most likely network for locating a given mobile device 22 and possibly track mobile devices as users roam between countries or networks.

Any computer system with access to the WAN 12 may exchange messages with the mobile device 22 through the wireless network gateway 16. Alternatively, private wireless network gateways such as wireless Virtual Private Network (VPN) routers could also be implemented to provide a private interface to a wireless network. For example, a wireless VPN implemented in the LAN 18 may provide a private interface from the LAN 18 to one or more mobile devices such as 22 through the wireless network 20. Such a private interface to a mobile device 22 via the wireless network gateway 16 and/or the wireless network 20 may also effectively be extended to entities outside the LAN 18 by providing a message forwarding or redirection system that operates with the message server 26. Such a message redirection system is disclosed in U.S. Pat. No. 6,219,694, which is hereby incorporated into this application by reference. In this type of system, incoming messages received by the message server 26 and addressed to a user of a mobile device 22 are sent through the wireless network interface, either a wireless VPN router, wireless gateway 16 or other interface, for example, to the wireless network 20 and to the user's mobile device 22. Another alternate interface to a user's mailbox on a message server 26 may be a Wireless Application Protocol (WAP) gateway. Through a WAP gateway, a list of messages in a user's mailbox on the message server 26, and possibly each message or a portion of each message, may be sent to the mobile device 22.

A wireless network 20 normally delivers messages to and from communication devices such as the mobile device 22 via RF transmissions between base stations and devices. The wireless network 20 may, for example, be a data-centric wireless network, a voice-centric wireless network, or a dual-mode network that can support both voice and data communications over the same infrastructure. Recently developed networks include Code Division Multiple Access (CDMA) networks, Groupe Special Mobile or the Global System for Mobile Communications (GSM) and General Packet Radio Service (GPRS) networks, and third-generation (3G) networks like Enhanced Data rates for Global Evolution (EDGE) and Universal Mobile Telecommunications Systems (UMTS), which are currently under development. GPRS is a data overlay on top of the existing GSM wireless network, which is used operating in virtually every country in Europe. Some older examples of data-centric networks include, but are not limited to, the Mobitex™ Radio Network ("Mobitex"), and the DataTAC™ Radio Network ("DataTAC"). Examples of known voice-centric data networks include Personal Communication Systems (PCS) networks like GSM and Time Division Multiple Access (TDMA) systems that have been available in North America and world-wide for several years.

In the system 10, a company which owns the corporate LAN 18 may provide a computer system 28 and a mobile device 22 to an employee. Stakeholders in this example include the user of the mobile device 22, the company which owns the corporate LAN 18, and a carrier which operates the wireless network 20. As described above, each of these stakeholders may have an interest in controlling the mobile device 22 or certain resources or assets resident on the mobile device 22.

Figure 2:
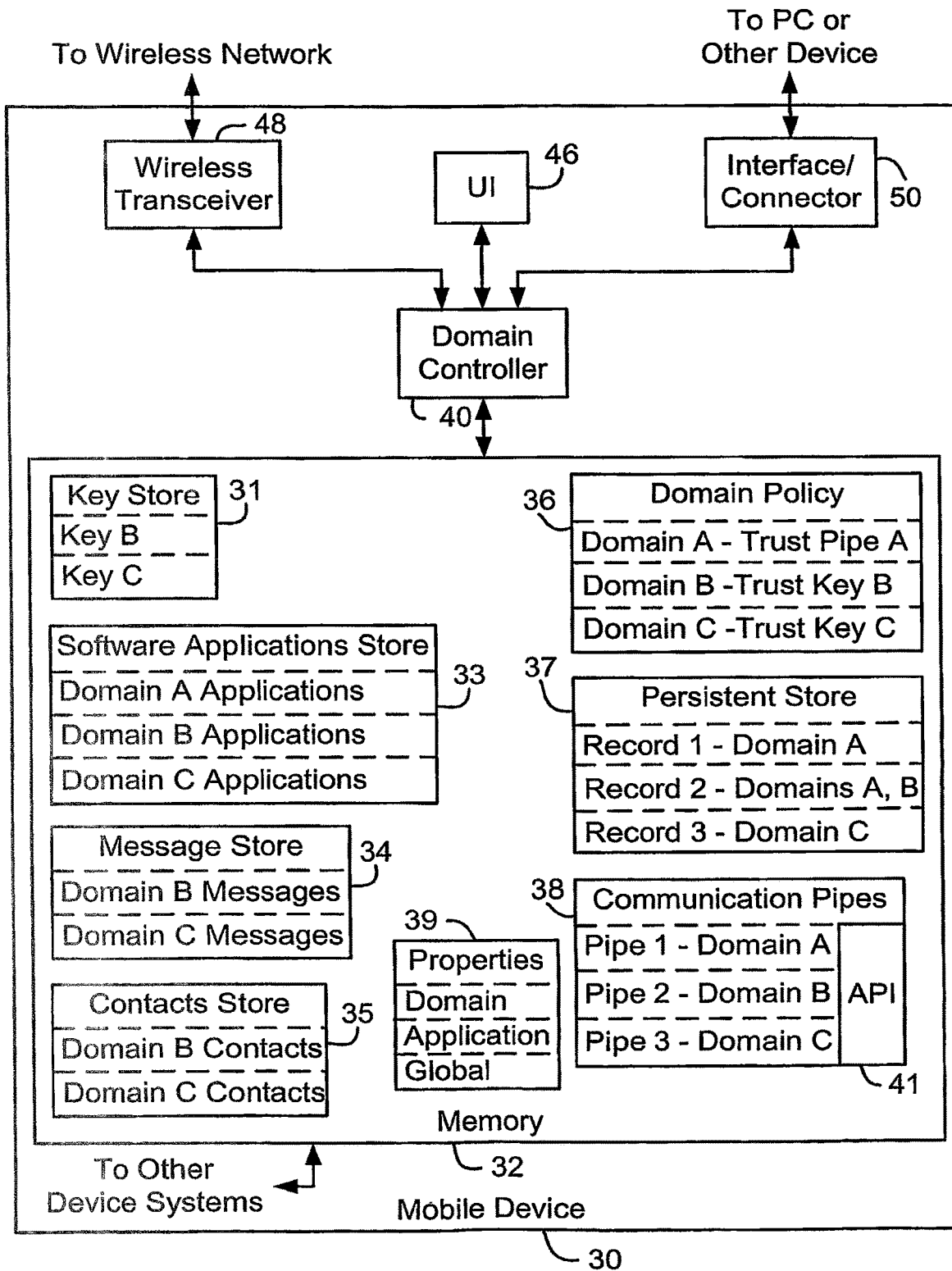
FIG. 2 is a block diagram of an exemplary wireless mobile communication device in which a system and method for secure control may be implemented.

FIG. 2 is a block diagram of an exemplary wireless mobile communication device in which a system and method for secure control may be implemented. It should be apparent to those skilled in the art that only the components involved in a secure control system are shown in FIG. 2. The mobile device 30 will typically include further components, depending upon the type and functionality of the mobile device 30.

As shown in FIG. 2, a mobile device 30 comprises a memory 32, a domain controller 40, a wireless transceiver 48, a user interface (UI) 46, and an interface or connector 50. The memory 32 includes a key store 31, a software applications store 33 configured to store software applications, a message store 34 for storing electronic messages, a contacts store 35 for storing contact information, a domain policy store 36, a persistent data store 37, a communication "pipes" table 38, and a properties store 39. These stores are illustrative of the types of information stores that may be provided in the memory 32. Other information stores may also be provided instead of or in addition to those shown in FIG. 2.

The memory 32 is a writeable store such as a RAM into which other device components may write data. Within the memory 32, the key store 31 stores cryptographic keys which may be used by the domain controller to implement domain policies. The software applications store 33 includes software applications that have been installed on the mobile device 30, and may include, for example, an electronic messaging software application, a personal information management (PIM) software application, games, as well as other software applications. The message store 34 stores electronic messages associated with one or more messaging software applications or services for which the mobile device 30 has been enabled. The contacts store 35 also stores information normally associated with such messaging software applications and services, including contact names, telephone and fax numbers, email addresses, mailing addresses, and the like. In the domain policy store 36, domain membership control policies ("domain policies"), which specify the criteria used to determine into which domain a software application, property, or other information should be placed, are stored. Persistent data, or data which survives the termination of a software application which created it, is stored in the persistent store 37. Communication pipes, described in further detail below, are mobile device communication assets and are listed in the communication pipes table 38. As will also be described below, the communication pipes table 38 may also include or reference an application programming interface (API) 41 through which data may be sent to and received from a communication pipe. Properties represent configuration data, and are stored in the properties store 39. Other data associated with the mobile device 30 or software applications installed on the mobile device 30 may be stored in the data stores shown in FIG. 2, in further data stores in the memory 32 but not shown in FIG. 2, or possibly in a separate memory component on the mobile device 30.

The wireless transceiver 48 enables the mobile device 30 for communications via a wireless network, as described above in conjunction with FIG. 1. The mobile device 30 is also enabled for communications with a similarly-equipped PC or other device, including another mobile device, via the interface/connector 50. In FIG. 2, the domain controller 40 is coupled to the memory 32, the wireless transceiver 48, the UI 46, and the interface/connector 50. As will be described in further detail below, access to such mobile device assets or resources is controlled by the domain controller 40. The domain controller 40 will likely be implemented most often as a software module or operating system that is executed by a mobile device processor (not shown). For example, where the mobile device 30 is a Java™ enabled device including a Java Virtual Machine (JVM) as its operating system, functionality of the domain controller 40 may be incorporated within the JVM or implemented as a software component that is executed by the JVM. Domain control at the operating system level provides more streamlined and reliable domain security than domain control at a software application level.

The UI 46 may include such UI components as a keyboard or keypad, a display, or other components which may accept inputs from or provide outputs to a user of the mobile device 30. Although shown as a single block in FIG. 2, it should be apparent that a mobile device 30 typically includes more than one UI, and the UI 46 is therefore intended to represent one or more user interfaces.

The interface/connector 50 enables information transfer between the mobile device 30 and a PC or another device via a communication link established between the interface/connector 50 and a compatible interface or connector in the PC or other device. The interface/connector 50 could be any of a plurality of data transfer components, including, for example, an optical data transfer interface such as an Infrared Data Association (IrDA) port, some other short-range wireless communications interface, or a wired interface such as serial or Universal Serial Bus (USB) port and connection. Known short-range wireless communications interfaces include, for example, "Bluetooth" modules and 802.11 modules according to the Bluetooth or 802.11 specifications, respectively. It will be apparent to those skilled in the art that Bluetooth and 802.11 denote sets of specifications, available from the Institute of Electrical and Electronics Engineers (IEEE), relating to wireless LANs and wireless personal area networks, respectively. Since communications between the mobile device 30 and other systems or devices via the interface/connector 50 need not necessarily be via a physical connection, references to connecting a mobile device to a PC or other device or system includes establishing communications through either physical connections or wireless transfer schemes. Thus, the mobile device 30 could be connected to a PC, for example, by placing the mobile device 30 in a mobile device cradle connected to a serial port on the PC, by positioning the mobile device 30 such that an optical port thereof is in a line of sight of a similar port of the PC, or by physically connecting or arranging the mobile device 30 and PC in some other manner so that data may be exchanged. The particular operations involved in establishing communications between a mobile device and another system or device will be dependent upon the types of interfaces and/or connectors available in both the mobile device and the other system or device.

As described above, multiple stakeholders may have interests in controlling mobile device assets or resources. In the mobile device 30, assets or resources include the wireless transceiver 48, UI 46, interface/connector 50, processor 40, and any of the stores or information in the memory 32. Some of these assets, such as the UI 46, might be usable by any software application or system on the mobile device 30, whereas one or more of the stakeholders may wish to exerts tighter control over other assets, including the wireless transceiver 48, interface/connector 50, and information stored in the memory 32, for example.

In order to provide multiple-stakeholder secure control of the mobile device 30, assets may be assigned to domains, as shown in the stores in the memory 32. The key store 31 includes cryptographic keys for domains B and C. The software applications store 33, domain policy store 36, persistent data store 37, and communication pipes table 38 respectively include software applications, domain policies, persistent data, and communication pipes associated with domains A, B and C. The message store 34 and contacts store 35 include messages and contacts associated with domains B and C. In this example, only domains B and C have associated messaging software applications or services which use the message store 34 and contacts store 35. Domain C includes a communication pipe, but not for the purposes of electronic messaging in this example. It is also possible that not all domains on a mobile device include a communication pipe. This may occur, for example, when a domain includes only software applications which provide local mobile device functions which do not require communications to or from the mobile device.

A domain is a collection of objects that share a common level of trust, and can be owned and controlled by a mobile device stakeholder, such as a mobile device user, a mobile device owner, a carrier or a service provider. Placing an object in a domain means that the object is trusted, and that its use can be restricted to other domain members. Each domain has a domain policy that controls which objects can become members of a domain, as described in further detail below. By creating domains and assigning one or more domains on the mobile device to each stakeholder, all stakeholders may maintain some level of control over mobile device assets that are part of the stakeholder's domain or domains. The domain controller 40 manages each domain on the mobile device 30 and maintains control over access to domain assets or resources to ensure that trust requirements are satisfied before such access is granted.

For example, most mobile devices may be purchased from any of a number of retailers. Once purchased, a mobile device user can preferably execute a pre-installed software application that allows the user to enter credit card and other billing information that is used to provision wireless network communication services. Those skilled in the art will appreciate that initial provisioning of such services on a new device may instead involve interactions with a carrier or service provider customer service representative via a telephone or Internet web page. The billing information is sent to a wireless carrier billing server, which verifies the billing information and send a registration message to the mobile device. The registration message is processed at the mobile device to establish carrier domain on the mobile device.

The carrier domain may include such assets as a browser that can be used to access Internet information and services via the carrier's wireless communication network. The user may then use the browser in the carrier domain to subscribe to a chat service, download the required software application from the Internet, and place the downloaded software application into the carrier domain. Other domain services, such as a domain backup frequency, for example, which specifies how often domain data should be backed up, may also be configured by the user for the carrier domain. Domain backup generally involves the transfer of domain data, possibly including software applications, properties, and persistent data to an external system. Such a backup operation allows a device user, owner, or other stakeholder to restore a domain in the event that the domain becomes corrupted, for example. Although the user may configure some settings for the carrier domain on the mobile device, the carrier maintains ultimate control over the carrier domain, as described in further detail below.

The user may also install other software applications and provision further services using the mobile device. An electronic messaging service which supports message exchange between the mobile device and a personal email or other messaging account is one service that may be of interest to a mobile device user. A PC software application component of such a service, when installed on a PC configured to access the personal messaging account, establishes a user domain on the mobile device if one has not already been established. Any mobile device software applications required to use the service are then downloaded and installed on the mobile device, and placed in the user domain. Such a service might also synchronize stored messages, contacts and possibly further data associated with the personal messaging account between the PC and the mobile device, creating messages, contacts, and data in the user domain. Since the electronic messaging service, and thus the user domain, have access to a communication medium through which messages are exchanged with the PC, the user domain might also support Internet browsing. Using the web browser, the user may then download and install other software applications to the user domain. Where the software application is a birthday reminder program, for example, this program may access all of the contacts that lie in the user domain and create reminders for their birthdays. The user domain may also have user-configurable settings, such as a domain backup frequency.

Where the user wishes to use the mobile device for work purposes as well, he or she may send a message, an email for example, to the IT department of his or her employer. The email includes the type of the mobile device and its network address. The IT department then sends a create domain message to the mobile device. When the create domain message is received at the mobile device, the user may first be prompted, using a UI 46 (FIG. 2), to accept this new domain. The new employer domain is then created. Having created the employer domain on the device, the IT department uploads such information as the company directory and a Customer Relationship Management (CRM) software application to the device. As described above for the carrier and personal domains, the employer domain may include settings which control behaviour and characteristics of the domain, such as domain backup frequency. It is contemplated, however, that at least the employer domain may be tightly controlled, such that employer domain configuration is established by the employer.

The introduction of domains in this example has some important mobile device control and security benefits. For example, the birthday reminder program in the user domain cannot access the company directory in the employer domain, even though they are both stored on the same mobile device. Also, synchronization of the user domain data, such as personal contacts, between the mobile device and a user's PC is accomplished through a user domain communication pipe, associated with the personal messaging service, so no corporate data from the employer domain is backed up to the user's PC when the user domain is backed up. Similarly, any synchronization or backup of the employer domain data is performed through the employer domain communication pipe, so that the user's personal contacts are not copied to the corporate server.

In addition, none of the software applications in the carrier domain or the user domain can access the communication pipe in the employer domain. Only software applications in the employer domain can access corporate data which normally resides behind a security firewall in the employer's corporate network. This prevents "Trojan horse" type software applications from compromising the employer's network security. The employer IT department prevents the user from installing software applications in the employer domain, as described in further detail below. The user can still install software applications in the user domain, but they are not trusted by the employer.

The carrier can disable or upgrade software applications in the carrier domain, but cannot effect software applications in the other domains. The carrier may, of course, prevent traffic from the mobile device on their communication network, but any mobile device could be enabled for operation in multiple different communication networks operated by different carriers.

Super user software applications provided by the mobile device manufacturer, for example, or some other source trusted by all domains, are members of multiple domains and thus present a unified view of data across multiple domains. This is useful in such software applications as an Address Book software application used to view and manage a contacts store on a mobile device. Such super user software applications have access to multiple domains, but also preferably respect the security of each domain. For example, a synchronization software application might access all data but only backs up domain data through the appropriate domain pipe. In order to avoid duplication of super user software application code on a mobile device, super user software applications may be outside the domains to which they have access, and effectively assume domain membership from time to time, as required. Super user software applications may therefore reside in a particular super user domain, or possibly in a part of a software applications store that is not associated with any particular domain.

The mobile device 30 (FIG. 2) implies a segregation of the various stores in the memory 32 into different domain storage areas. However, it should be appreciated that implementation of domains on a mobile device may be much more flexible than would be apparent from FIG. 2. For example, entries in any of the stores in the memory 32 need not be ordered by domain. The software applications store 33 may include a first software application in domain A, followed by another software application in domain C, and then a third software application which is also in domain A. Even though the domain A software applications in this example do not occupy contiguous locations in the software applications store 33, they are nonetheless associated with domain A.

Figure 3:
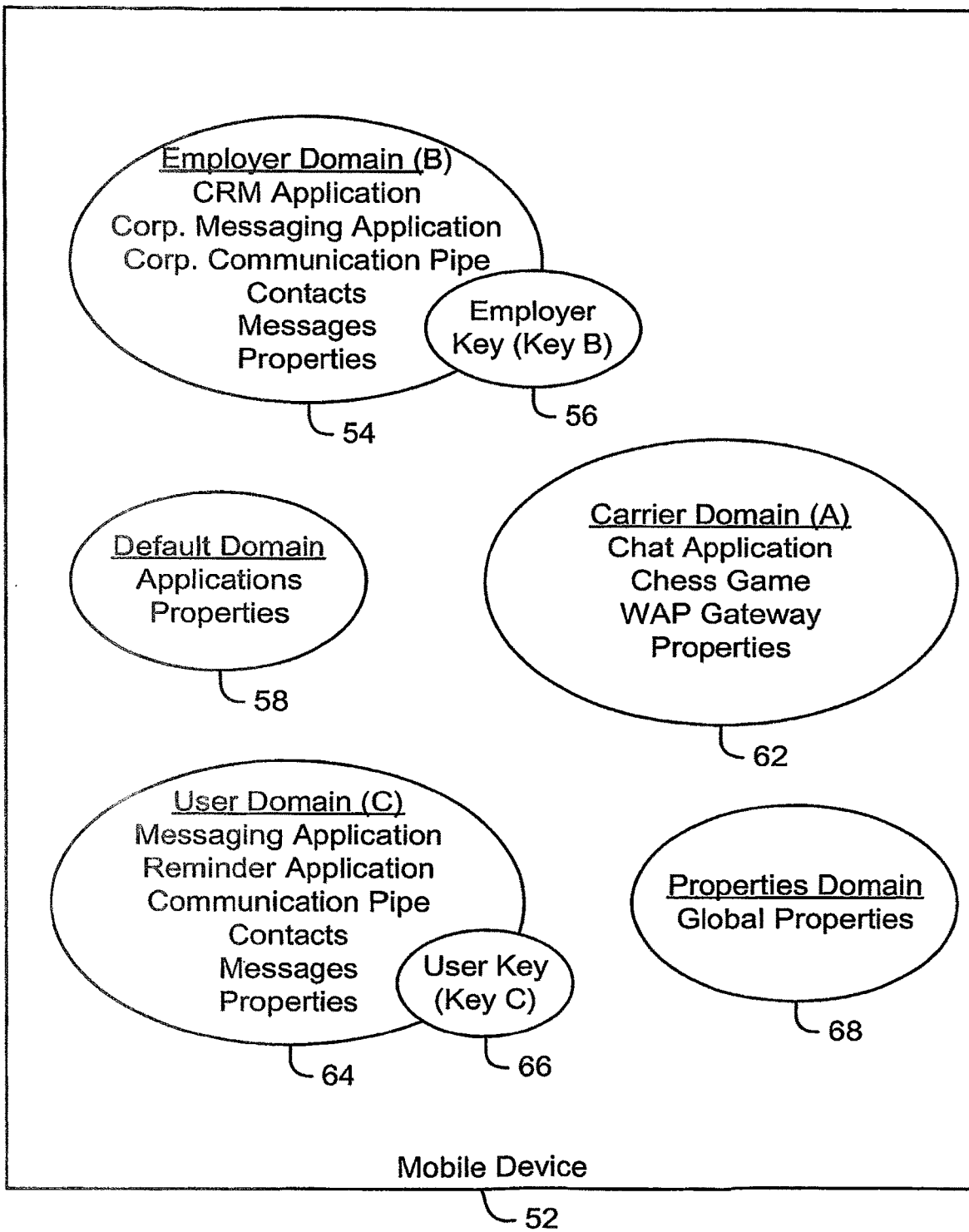
FIG. 3 is a block diagram illustrating multiple domains on a wireless mobile communication device.

FIG. 3 is a block diagram illustrating multiple domains on a wireless mobile communication device. FIG. 2 shows domains from the perspective of physical device components, whereas FIG. 3 illustrates the practical effect of domains on mobile device assets. Therefore, the actual mobile device may be the same in FIGS. 2 and 3, although domain-based secure control of a mobile device will become more apparent from FIG. 3 and the following description thereof.

The mobile device 52 in FIG. 3 includes an employer domain 54, a carrier domain 62, and a user domain 64, each including software applications, a communication pipe, and properties. The employer domain 54 and the user domain 64 also include contacts and messages. The employer domain 54 and the user domain 64 are respectively secured using the employer key 56 and a user key 66, as will be described in further detail below. As will be apparent from a comparison of FIGS. 2 and 3, the carrier domain 62, the employer domain 54, and the user domain 64 are similar to the domains A, B and C, respectively, in FIG. 2. A default domain 58, which contains software applications and properties, and a properties domain 68, which includes at least some of the properties stored in the properties store 39 (FIG. 2), are also shown in FIG. 3.

Placing a software application in a domain gives it access to domain assets, most notably the domain communication pipe(s) and domain data such as persistent data and properties. In the employer domain 54, for example, the CRM software application and the corporate messaging software application have access to the corporate communication pipe, data such as corporate contacts and messages associated with a corporate messaging account, and properties in the employer domain 54. Libraries within a domain are similarly accessible only from software applications in that domain.

Some software applications may be members of more than one domain. This grants the software application access to data in multiple domains. In FIG. 3, both the employer domain 54 and the user domain 64 include a messaging software application. In this case, it is desirable to have a single super user messaging software application that is a member of or has access to both domains. However, the owners of both domains would have to trust such a software application. Since the user of the mobile device has control over the user domain 64, a software application trusted by another domain could fairly easily be granted access to the user domain 64 by the user. When other domains than the user domain 64 are involved, each domain owner has to trust a super user software application and grant access to such a software application to its respective domain.

Software application provisioning policy is preferably set on a per domain basis, so that the domain owner can control which software applications can be loaded into a domain. There are several methods of controlling/assigning a software application to a domain. These are discussed in further detail below.

A communication pipe is a means of communication between the mobile device and some external entity. A particular physical transport layer, such as Universal Serial Bus (USB), Bluetooth™, a serial port, 802.11 and GPRS, can represent several logical communication pipes depending on the gateway at the other end. For example, a GPRS radio can be used to communicate with both the carrier WAP gateway in the carrier domain 62, as well as a corporate gateway through the corporate communication pipe in the employer domain 54. In this case, both the WAP gateway and the corporate communication pipe represent separate communication pipes even though they use the same physical transport. One reason for this separation is that even though the same physical transport is used, the gateways are controlled by separate stakeholders.

Placing a communication pipe in a domain means that the domain owner trusts that communication pipe. This is usually due to their control of the gateway or of the encryption keys that are used for communications over the communication pipe. In the case of the corporate communication pipe, the communication pipe often includes a gateway through a corporate security firewall, such that access to the communication pipe represents a possible avenue of attack against a corporate infrastructure. By placing the communication pipe inside a domain that they control, a corporate entity such as an employer restricts access to the communication pipe and reduce the likelihood of attack.

As described above, any data that survives the termination of the software application that created it is said to be persistent. In a more traditional computer architecture, persistent data is written to a disk or database. Information in main memory is normally not persistent and disappears when the software application exits, gracefully or otherwise, unless the software application takes explicit action to preserve the data by writing it to a persistent store. Like most computers, mobile devices have persistent and non-persistent storage. Persistent data is often shared between software applications. Such sharing of data or software application integration leads to useful and convenient features but also introduces the possibility of data theft or corruption by unscrupulous software applications.

Domains allow the benefits of software application integration while mitigating the risk to important data. By default, all persistent data created by a software application is placed in the same domain as the software application. Only software applications in the same domain can access this persistent data. This allows the domain owner to ensure that only trusted software applications can access persistent data. Untrusted software applications can still be loaded onto a mobile device without compromising data integrity or security.

Properties are persistent data that represent configuration information that is either global, domain or software application specific. Unlike most persistent data, properties allow a finer grain of access control. For example, it is possible to define a property that can be read by a software application but not modified. Properties can be placed in a domain and used to store user configuration or to set policies.

There may be several ways to add, modify, store, backup and restore configuration data on a mobile device. In general, known configuration data handling schemes relate to configuration data that is global to the mobile device. Handling of configuration data on a per application basis is normally left up to the software application. However, a system level domain-based mechanism for handling software application configuration data is desirable, for example, to place information about a software application in a secure location so that it can be used to define domain provisioning policy. When configuration data is removed from the control of the software application, the software application need not be trusted to set its own provisioning policy or manage its own application lifecycle.

As well as supporting software application provisioning, properties provide a consistent set of software application configuration services to the software application developer. These software application configuration services include automatic backup and restoring of properties, automatic generation of a user interface for editing properties, programmatic access to properties, a secure method of exchanging properties additions or changes over the air from a mobile device, and a secure and tamperproof offline properties storage mechanism. Also, by defining properties at a global scope, properties may be used to control configuration of a mobile device, not just software applications on such a device.

Properties are named, typed data. They are akin to resources except that they are meant to be edited, whereas software application resources are usually defined when a software application is created and are not normally changed. The name is an identifier that a software application can use to refer to a property, and the type indicates a type of data of the property. Properties may also have a description, separate from the name. Separating the description from the name allows a properties editing to be internationalized without recompiling a software application.

The following property identifies a server with which a software application interacts:

Name: Server
Type: String
Value: http://sap.server.net/crm
Description: CRM Server.

This property might be used by a CRM software application on a mobile device that accesses data on a corporate server. The CRM software application is loaded in the employer domain 54 in FIG. 3. The server property, required by the CRM software application, is also placed or created in the employer domain 54.

Properties preferably have access control. Not all properties can be read or modified by all software applications or stakeholders on a mobile device. For example, the CRM software application is able to read the name of the CRM server in the value field of the server property, but cannot modify it. Additionally, the ability to modify the server URL may be reserved for the employer or corporate IT department. This is particularly important when application properties are tied to system resources. For example, if a mobile device security firewall uses an application property to allow or deny access to a corporate gateway through the corporate communication pipe, then it would be important to prevent the software application from modifying this property. In this case, the software application cannot generate a user interface to allow editing this property, since it cannot modify the property. For this reason, it is important to have a trusted application generate the user interface for editing application properties. This trusted software application or Property Editor ensures that properties are properly labelled, to prevent a user being misled into modifying a property, and that access control rules are enforced. Each property may have access control rules for each software application, as well as for each of the stakeholders on a mobile device. Since properties may be included in every domain on a mobile device, a Property Editor is preferably implemented as a super user software application and thereby granted access to the properties in multiple domains.

For example, the following property allows a software application to read but not modify or write to the property. A user or a domain is able to both read and write to the property. Global rights are normally associated with a mobile device owner, which is not necessarily the user, such as when the mobile device was provided to a user by an employer. In this example, global rights include reading, but not writing to, the property.

Name: HTTPAccess
Type: Boolean
Value: false
Description: Allow HTTP Access
Application: +read, −write
User: +read, +write
Domain: +read, +write
Global: +read, −write Properties are preferably defined within a scope. Valid scopes, as shown in the properties store 39 in FIG. 2, may include global, domain and application. When a software application requests a list of properties, it gets all readable global properties, all readable properties in the software application's domain, assuming the software application is a member of a domain, and all readable application properties for the software application. In general, any readable properties which may affect the software application are provided in such a list. The properties placed within a domain may include application properties for the software applications within the domain, as well as domain properties. Global properties are placed in a separate properties domain 68, which is preferably accessible to all mobile device software applications, regardless of the domain in which each software application exists.

Access rules may also be applied to control the creation of new properties of any particular scope. For example, the following definition of global scope indicates that global properties may be created by a user but not a software application:

Scope: Global
Application: −create
User: +create.

Domain scope properties for a particular domain may be defined, for example, as:

Scope: Domain
Name: Employer
Application: +create
User: −create,

Which means that software applications in the employer domain can create new properties in that domain. A user cannot create new employer domain properties in this example.

Software applications have programmatic access to read properties, and possibly to modify and create properties. New properties can be created in any of the software application's scopes, subject to scope access rules. By default, new properties created by a software application preferably have application scope.

As described above, a trusted software application, a Property Editor, generates a user interface for editing properties. Since software applications may be able to modify and create properties, there should be a way to programmatically invoke the Property Editor. For example, each software application may have a menu item called "Options" that can be selected to invoke the Property Editor. When invoked from within a software application, the property editor does not display properties that cannot be read by the software application. Properties that cannot be modified by the software application are displayed in a read only mode.

The Property Editor may group properties into multiple pages based on the scope of the properties, for example, to reduce clutter. It may be necessary to allow the software application to define property groups as a hint to the Property Editor in the case where there are too many properties to fit on a single page.

Like other domain data, properties can preferably be backed up and restored through one or more communication pipes, such as through a serial port or over the air. In reference to FIG. 2, backup and restore operations may be performed using the wireless transceiver 48 or the interface/connector 50.

Backup through an interface or connector such as a serial port may be initiated by a PC or other device with which a mobile device communicates. All application properties may be backed up by default, so that no serialization code is needed in the software applications. As well, any property data, and other domain data, that is stored to a disk may be digitally signed and encrypted before being sent to the mobile device. This prevents tampering with the property data as a way to circumvent the access control mechanisms.

Over the air backup and restore may be initiated either by a mobile device or by a remote server or system. Mobile device-initiated backup and restore are important for transports that do not support sending data to a device without first requesting such data. For example, if the device can only access a remote network through a WAP gateway, the user initiates a backup of the device. This could be done by explicit user action or by setting up a timer. Over the air restoration allows restoring properties to the last saved state. Again, this could be explicitly initiated by the user as part of a device recovery task.

Server initiated backup and restore are forms of remote control of a mobile device. Where the path to the device allows server-initiated communication, the properties can be completely controlled from a remote server. Remote server actions may include, for example creating a property, modifying a property, deleting a property, getting a list of properties (globally or software application specific), and getting a list of software applications on a mobile device.

One purpose of domains is to define a restricted set of objects with a common trust relationship. In general, no access to domain software applications or data is granted to external entities, but all members of a domain are completely trusted. As described above, however, properties have a further level of access control. Although certain software applications may span several domains, such a software application may only access a domain if it is trusted and has been granted access to the domain by the owner of that domain.

The fundamental domain operations that are controlled are creating and deleting domains, managing software applications (installing and deleting), managing properties (creating, reading, modifying), and access to persistent data (creating, reading, modifying). A finer grained control can be achieved by introducing additional domains, subdomains or domain libraries.

A subdomain is a domain that lies within another domain. Members of a subdomain inherit all of the privileges of the parent domain. An example of a subdomain would be a human resources (HR) subdomain within the employer domain 54. All software applications within the employer domain 54, including those in the HR domain, can access the company directory on a corporate network through the corporate data pipe, but only software applications in the HR domain may be able to access personal information on the corporate network. This allows different levels of trust within a domain while sharing some common resources.

If a code library is a member of a domain, then it may be used to grant restricted access to domain data to software applications outside the domain. This allows a domain owner to write their own access control rules and use them to grant limited access to domain data through the library. By default, domain libraries do not allow non-domain software applications to make calls to domain libraries, but the domain owner could relax this restriction on a per library basis. In this sense, a domain library that is accessible to software applications outside a domain is analogous to a domain controller in that it controls access to domain assets or resources associated with the library. Such a domain library permits implementation of a finer granularity of domain access control or more complex access rules for a particular domain, or for specific assets or resources within a domain.

In order for domain operations to be secure, domain policies control how objects become members of a domain. There are several different possible domain policies, each of which relies on a different trusted entity.

Perhaps the simplest domain policy is to allow objects to place themselves into a domain. This relies on the unlikelihood of an untrusted entity knowing about the domain. Information received at a mobile device is placed into a domain indicated in the received information or possibly control information received with the information.

Another relatively simple scheme is to trust the communication pipe. This means that anything received over a domain communication pipe is placed in that domain. This works well when the domain owner can control the pipe, as is the case with the carrier domain 62, for example. Referring to both FIG. 2 and FIG. 3, where domain A of FIG. 2 corresponds to the carrier domain 62 in FIG. 3, this type of domain policy is specified as shown in the domain policy store 36. When information is received over the WAP gateway (pipe A), the domain controller 40 determines that it belongs to domain A, the carrier domain 62, and places the information in that domain. The domain controller 40 accesses the domain policy store 36 to determine whether the domain for the communication pipe over which the information was received is configured for a trust the pipe domain policy. The domain controller 40 may determine the domain for the communication pipe by consulting the communication pipe table 38. Where the API 41 is provided for transferring data between the domain controller 40 and any communication pipe in the communication pipe table 38, the communication pipe table may indicate to the domain controller 40 the domain to which the communication pipe belongs. It is also possible that received information may include an indicator of the domain in which it should be placed. The domain controller 40 then accesses the domain policy store 36 to determine the domain policy in effect for that domain.

A stronger method of domain security relies on cryptography. In a public key system, each domain has an associated public and private key. Anything that is added to a domain must be digitally signed using the domain private key. Only digital signatures generated using the domain private key can be verified using the domain public key, such as the keys B and C, 56 and 66. This allows domain information to arrive through any pipe.

For example, an employer would normally want to ensure that the creation and control of the employer domain 54 is secure. A secure connection is preferably established between the mobile device 52 and the employer system before a create domain message is sent to the mobile device 52. A secure connection could be established through encryption of the create domain message or other cryptographic techniques, or using a secure communication protocol between the employer system and the mobile device 52. Encryption may involve public key cryptographic operations, or "shared secret" type cryptography. Secure domain creation techniques may also be used by other stakeholders to securely create domains on the mobile device.

In order to ensure that all information for the employer domain is authentic, both when the employer domain is created and when software applications or data are subsequently to be placed in the employer domain, information destined for the employer domain is digitally signed using a signature private key of the employer, and the mobile device 52 then verifies the digital signature before it places the data and software applications in the employer domain.

Digital signature schemes generally involve some sort of transformation of digitally signed information to provide for checking the integrity of the information and authentication of a source of the signed information. For example, according to one digital signature scheme, a digest of information to be digitally signed is first generated using a non-reversible digest algorithm or transformation. Known digest algorithms include Secure Hashing Algorithm 1 (SHA-1) and Message-Digest algorithm 5 (MD5). Other digest techniques that produce a unique digest for each unique input may also be used. The digest is then further transformed using a signer's signature private key and a signature algorithm to generate a digital signature. In order to provide for digital signature verification, signature algorithms are normally reversible, but only when a signature public key corresponding to the signature private key is used. If the signed information has been changed after it was signed, or the digital signature was generated using any key other than the signer's signature private key, then signature verification using the signer's signature public key fails.

In the context of secure domain control on the mobile device 52, a domain owner digitally signs any information destined for a domain on the mobile device 52 using a signature private key. At the mobile device 52, the information is not placed in the domain unless the digital signature is verified using the domain owner's signature public key 56 or 66 for the domain. Referring again to both FIGS. 2 and 3, and specifically to the employer domain 54 (domain B), when digitally signed information is received by the mobile device 30, the domain controller 40 determines the domain for which the information is destined. The domain controller 40 may determine the appropriate domain by accessing the communication pipes table 38, or based on a domain indication either from the API 41 in the communication pipes table 38 or in the received information. Since cryptographic or "trust the key" domain policies facilitate receipt of data for a particular domain over other than the communication pipe(s) in that domain, a domain indication in received information may be particularly useful in conjunction with this type of domain policy. Once the appropriate domain has been identified, the domain controller 40 then retrieves the corresponding key for the domain, key B in this example, from the key store 31. The information is placed in the domain where the digital signature is verified using the key B. The received information may be discarded, or possibly placed in the default domain 58 if the digital signature is not verified. The operations of the domain controller 40 are similar for other domains having a trust the key domain policy, such as the user domain 64 (domain C).

As those skilled in the art of public key cryptography will appreciate, where a public key is not stored on a mobile device, it is obtained from a public key repository if it is not available in the key store 31 when required. It should also be appreciated that other cryptographic access control mechanisms are possible, using cryptographic challenges and responses or shared secret keys, for example.

When digital signature verification for received software applications or data fails, or software applications or data have not been signed, the software applications or data may be placed in a default domain 58. The default domain 58 includes software applications and properties and possibly allows access to unrestricted device assets or resources. A default domain such as 58 may also provide temporary storage of unsigned or improperly signed software applications and data. Any software applications and data in the default domain 58 could then be placed into a user-controlled domain at a later time. In order to prevent denial of service type attacks exploiting the default domain 58, resources available to the default domain 58 are preferably limited. By limiting the amount of memory that objects in the default domain 58 may occupy, for example, inundating a mobile device with unsigned or improperly signed information cannot deplete the amount of memory available to other domains on the mobile device to such a degree as to render the mobile device or software applications in other domains inoperable.

As a further alternative domain policy, when a domain is created, it may include an access list established by the domain owner that describes all allowable members. This works well with software applications, but becomes complex where control of persistent data is required. A hybrid scheme where data is verified by some other method might be appropriate here.

If a domain owner trusts the holder of the device, or the holder of the device is the domain owner, then each new object could be placed in the domain by some on-device user interface, dependent upon a prompt to the user. According to this domain policy, when a software application or other domain data is received at a mobile device, the user either accepts the software application or data and places it in a domain or rejects the software application or data.

It may make sense to use different security techniques for different types of objects. For example, domain creation may be controlled cryptographically. However, once a domain is established, it may trust the domain pipe for further domain changes. Different domains might also use different security measures. Since the user domain 64 is controlled by the user of the mobile device 52, the user may be prompted to accept or reject software applications and data for the user domain 64, whereas the employer domain 54 and the, carrier domain 62, as shown, use a cryptographic domain policy and a trust the pipe domain policy, respectively.

In regard to creating new domains, different control mechanisms could also be applied. As described above, new domains could be created in response to requests from a stakeholder, possibly subject to acceptance by the user. Domain creation could be further restricted by trusting the mobile device manufacturer. The device manufacturer could set up domains when the mobile device is manufactured. When a particular component of a mobile device is configured to store information, then that component could be manufactured with certain domains. This technique applies to GPRS mobile devices, for example, which require a Subscriber Identity Module or SIM for operation. Domains could be configured on a SIM by a SIM manufacturer, owner or other stakeholder before the SIM is provided to a user.

Figure 4:
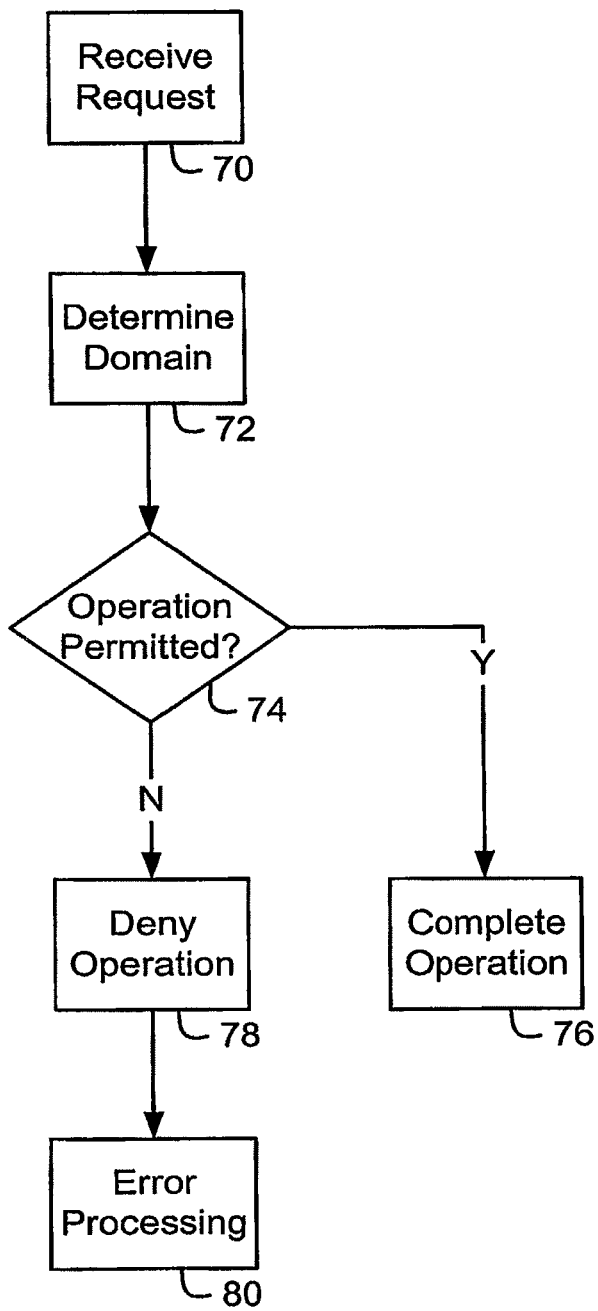
FIG. 4 is a flow diagram showing a method for secure control of a wireless mobile communication device.

FIG. 4 is a flow diagram showing a method for secure control of a wireless mobile communication device. The method begins at step 70, where a request to perform an operation is received at the mobile device. The mobile device 30 (FIG. 2), for example, may receive such a request through the wireless transceiver 48, from a UI 46, through the interface/connector 50, or from a software application running on the mobile device 30. A received request is then passed to a domain controller 40 (FIG. 2), which determines in which domain the assets or resources affected by the requested operation are located. Referring again to FIG. 2, if the request is a memory access request by a software application to read record 1 in the persistent data store 37, then the domain controller 40 determines that record 1 belongs to domain A. In FIG. 2, a domain identifier or indicator is stored with each record in the persistent data store 37. Objects in other stores may similarly include such a domain identifier to allow the domain controller to determine the domain to which an object belongs. For domains with cryptographic or trust the key domain policies, digitally signed domain data, which may include software applications, properties, persistent data, or other information, that is, received by the mobile device 30 may be stored in signed form. The domain controller 40 can then confirm that an object is trusted by a particular domain by verifying the digital signature stored with the object using the appropriate cryptographic key. The domain controller 40 may also be configured to establish and maintain or at least consult an access control list that specifies associations between domains and the objects that have been granted access to the domains. Different domains on a mobile device may also use different schemes for indicating domain membership, provided the domain controller on the mobile device is configured to handle such different schemes.

At step 74, the domain controller determines whether the requested operation is permitted. This determination involves determining the domain from which the received request originated. As described above, each member of a domain is trusted and has access to assets within that domain. The requested operation is completed at step 76 where the operation is permitted. In the above example of a request from a software application to read record 1, the read operation is completed where the requesting software application is in domain A, the same domain as the record to be read. The domain controller 40 may determine, and possibly confirm, the domain from which a request originates substantially as described above in the context of determining the domain to which an asset belongs. Where the operation is not permitted, the operation is denied at step 78, and error processing operations, if any, are performed at step 80. Error processing operations at step 80 may include, for example, returning an error or failure indication to the requesting object and displaying an error message to a user of the mobile device.

The determination at step 74 may include further or alternative operations beyond determining whether the received request originated from the same domain as the domain assets affected by the requested operation. A "same domain" determination represents but one example of how a trust relationship might be verified. In the case of a super user software application, the software application might not belong to any particular domain. Therefore, instead of determining an originating domain, a domain controller determines whether the super user software application is trusted and has been granted access to the affected domain assets by the domain owner. Also, as described above, properties may have additional access rules. As such, when a requested operation affects properties, further criteria may be applied at step 74 to determine whether the operation is permitted. Domain policies may also be examined by a domain controller at step 74, where the received request relates to new domain data that is to be placed into an existing domain. If the request is a create domain message, then step 74 may involve interaction with a user to accept or reject a new domain.

Although the method in FIG. 4 has been described primarily in the context of a read operation as an example of a controlled operation, it should be apparent that other operations may be similarly controlled. Domain assets thereby remain protected from objects in other domains, and may be accessed only by trusted objects in the same domain or super user software applications that are trusted by multiple domains. When data is to be sent using a particular domain's communication pipe, for example, the domain controller first determines whether an object or domain attempting to send the data has been granted access to the communication pipe by the domain owner, such as by determining whether the sending object or domain is in the same domain as the communication pipe. The domain controller 40 accesses the communication pipes table 38 to determine to which domain a communication pipe belongs, and then send data to the communication pipe via the API 41 where the sending object in that same domain or has been granted access to the communication pipe in that domain by the domain owner.

The method shown in FIG. 4 relates to control of a mobile device based on domains. Global, domain, or application properties are used to establish further controls, as described above. The processing of a request for an operation may therefore also or instead involve checking such properties to determine if an operation is permitted. Although a software application might have access to a communication pipe in a domain, an application property might indicate that the software application has expired, or a global property may specify that the software application cannot send data from the mobile device. Although properties are included in the domains shown in FIGS. 2 and 3 and affect operations associated with domains, property-based control may be implemented separately from domain-based control. For example, where an operation is to be performed by a software application, the application properties associated with software application may first be accessed to determine whether the operation is permitted for the software application. A request for the operation is then sent to a domain controller only if the application properties permit the operation by the software application. In this example, application properties provide a first level of control, and domains provide a further level of control. It should be appreciated, however, that either property-based control or domain-based control may be implemented on a mobile device. Although these control schemes complement each other, they can instead be independent.

Having described domains, properties and related security mechanisms, domain- and property-based services and uses will now be described.

Since a domain describes a set of data and possibly a communication pipe, the communication pipe is used to perform a backup operation on a domain. This involves sending all of the domain data, including properties and software applications, over the communication pipe to a backup system or server. Similarly, as part of a device recovery plan, the backup system or server is used to re-establish the domain on the mobile device and restore all of the data. In this case, the domain defines what should be backed up, as well as the trusted communication path to use. Domains that do not include a communication pipe may be backed up through another available data pipe or transport that has not been assigned to a domain. Digital signing and encryption techniques, when used during backup and restore operations, ensure security and integrity of domain data.

It is also possible to place objects from multiple domains into single container classes. When a software application requests an iterator on such a class, it enumerates only the elements in the proper domain. Super user software applications, such as an Address Book software application, should be able to request an iterator for a particular domain. This makes it easy to write a software application where the user requests a domain specific view on the data. For example, the Address Book could be configured to display only contacts in the employer domain 54.

Super user software applications that span domains also assume domain membership for a finite period of time. This allows a super user software application to act on the behalf of a domain without having to duplicate code that enforces domain access control. An example where this might be useful is in a data synchronization software application. When it is backing up a domain, such a software application assumes membership in that domain. This allows the underlying operating system to ensure that domain data is only written to the domain communication pipe.

One of the primary uses for domains is to provide data security. By placing a software application in a domain, access to that software application's data is restricted to other software applications in that domain. Levels of security within a single organization can be represented by multiple domains or by subdomains. Where the enforcement of domain policies is performed by a mobile device system such as a JVM and not a software application, bad programming on the part of the developer is less likely to result in a security breach.

Domains are also useful in over the air software application provisioning for mobile devices. Where each stakeholder is provided with a respective domain, software applications installed in one domain do not affect mobile device assets, software applications, or data in other domains. Thus, neither a carrier providing communication services to a mobile device nor an employer as an owner of a mobile device need be concerned that user software applications installed in a user domain on the mobile device will affect carrier domain assets, software applications or data or corporate assets, software applications or data. Software application provisioning may also include loading of configuration data for a software application in the form of application properties. Other aspects of software applications on a mobile device are also controllable using application properties. A domain owner, such as a service provider, may specify that a software application may be executed only a specific number of times, only a specific number of times in a certain time period, or only a specific number of times before service charges apply. By placing properties within domains, a stakeholder maintains secure control over domain assets, including software applications in the domain.

Just as properties can be mapped to mobile device resource access such as HTTP access and, phone access, for example, they can also be mapped to device state information, including information on available memory and date and time of last mobile device reset. This allows remote querying of the mobile device state. Such a query could be initiated by a device management server or be triggered by a timer on the mobile device. By querying these system-mapped properties, a server can remotely manage the mobile device. Some of these properties will be local to a domain, such as a maximum number of recipients per message, and some will be global to the device, the minimum length of a password, for example.

Figure 5:
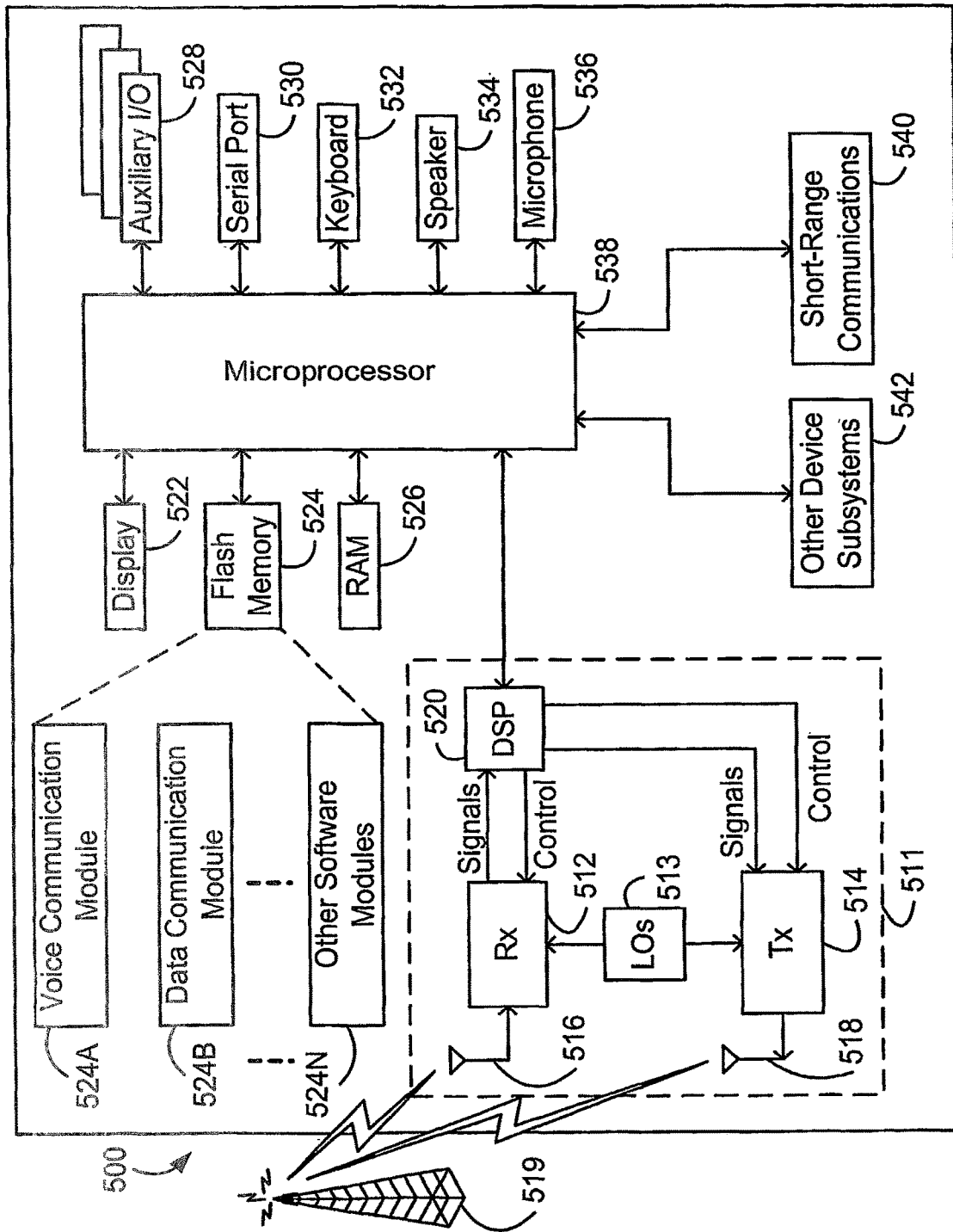
FIG. 5 is a block diagram of an example wireless mobile communication device.

FIG. 5 is a block diagram of an example wireless mobile communication device. The mobile device 500 is preferably a two-way communication device having at least voice and data communication capabilities. The mobile device 500 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein simply as mobile devices.

The mobile device 500 includes a transceiver 511, a microprocessor 538, a display 522, Flash memory 524, RAM 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the Flash memory 524, which may alternatively be another type of non-volatile store such as a battery backed-up RAM, the mobile device 500 preferably includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 5 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and may also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications, then a plurality of LOs 513 can be used to generate a plurality of frequencies corresponding to the network 519. Although two antennas 516, 518 are depicted in FIG. 5, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., will be dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Depending upon the type of network 519, the access requirements for the mobile device 500 may also vary. For example, in the Mobitex and DataTAC data networks, mobile devices are registered on the network using a unique identification number associated with each device. In GPRS data networks, however, network access is associated with a subscriber or user of the mobile device 500. A GPRS device typically requires a SIM in order to operate the mobile device 500 on a GPRS network. Local or non-network communication functions (if any) may be operable, without the SIM, but the mobile device 500 will be unable to carry out any functions involving communications over the network 519, other than any legally required operations, such as '911' emergency calling. As described above, domains may be established on a SIM before it is provided to a user, with further domains possibly being added to a SIM after it has been installed in a mobile device. When a GPRS device also includes a memory component, domains may exist on the memory component and the SIM. Different types of domain control and domain policies could be implemented depending upon the location of a domain.

After any required network registration or activation procedures have been completed, the mobile device 500 may send and receive communication signals, preferably including both voice and data signals, over the network 519. Signals received by the antenna 516 from the communication network 519 are routed to the receiver 512, which provides for signal amplification, frequency down conversion, filtering, channel selection, analog to digital conversion, etc. Analog to digital conversion of the received signal allows more complex communication functions, such as digital demodulation and decoding to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown in FIG. 5 for both voice and data communications, it is possible that the mobile device 500 may include two distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 may also provide for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. Other, high-level communication software applications, such as a voice communication software application 524A, and a data communication software application 524B may be stored in the Flash memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, Flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O 528, keyboard 532, speaker 534, or microphone 536. Such interfaces are designated generally as UI 46 in FIG. 2.

Some of the subsystems shown in FIG. 5 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as Flash memory 524. In addition to the operating system and communication modules 524A-N, the Flash memory 524 may also include a file system for storing data. The Flash memory 524 may also include data stores for application, domain and global properties. The operating system, specific device software applications or modules, or parts thereof, may be temporarily loaded into a volatile store, such as RAM 526 for faster operation. Moreover, received communication signals may also be temporarily stored to RAM 526, before permanently writing them to a file system located in the Flash memory 524. Although the device 500 includes a Flash memory 524 as a non-volatile store, it should be appreciated that Flash memory represents one example of a non-volatile memory. Other memory arrangements, such as battery backed-up RAM, for example, may be used instead of the Flash memory 524.

An exemplary software application module 524N that may be loaded onto the mobile device 500 is a PIM software application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The Flash memory 524 preferably provides a file system to facilitate storage of PIM data items on the device. The PIM software application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 may also be manually synchronized with a host system by placing the mobile device 500 in an interface cradle, which couples the serial port 530 of the mobile device 500 to the serial port of the host system. The serial port 530 may also be used to download other software application modules 524N, properties, and data to one or more domains on the mobile device 500. This wired download path may further be used to load an encryption key onto the mobile device 500 for use in secure communications, which is a more secure method than exchanging encryption information via the wireless network 519.

Additional software application modules 524N, properties and data may also be loaded to domains on the mobile device 500 through the network 519, through an auxiliary I/O subsystem 528, through the short-range communications subsystem 540, or through any other suitable subsystem 542, and installed by a user in the Flash memory 524 or RAM 526. Such flexibility in software application installation increases the functionality of the mobile device 500 and may provide enhanced on-device functions, communication-related functions, or both. For example, secure communication software applications may enable electronic commerce functions and other such financial transactions to be performed using the mobile device 500.

When the mobile device 500 is operating in a data communication mode, a received signal, such as a text message or a web page download, will be processed by the transceiver 511 and provided to the microprocessor 538, which will preferably further process the received signal for output to the display 522, or, alternatively, to an auxiliary I/O device 528. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with a plurality of auxiliary I/O devices 528, which may include a thumbwheel input device, a touchpad, a variety of switches, a rocker input switch, etc. The composed data items input by the user may then be transmitted over the communication network 519 via the transceiver 511. Where the data communication module 524B is in a particular domain, received and composed data items would preferably be stored in that domain, and the composed data items would also be sent over the domain data pipe.

When the mobile device 500 is operating in a voice communication mode, the overall operation of the mobile device 500 is substantially similar to the data mode, except that received signals are preferably output to the speaker 534, voice signals for transmission are generated by a microphone 536, and a different domain data pipe and assets may be used. Alternative voice or audio I/O subsystems, such as a voice message recording subsystem, may also be implemented on the mobile device 500. Although voice or audio signal output is preferably accomplished primarily through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 may also be included in the mobile device 500. For example, the subsystem 540 may include an infrared device and associated circuits and components, or a Bluetooth or 802.11 short-range wireless communication module to provide for communication with similarly-enabled systems and devices. Thus, owner information insertion, owner control information insertion, and software application loading operations as described above may be enabled on the mobile device 500 via the serial port 530 or other short-range communications subsystem 540.

It will be appreciated that the above description relates to preferred embodiments by way of example only. Many variations on the systems and methods described above will be obvious to those knowledgeable in the field, and such obvious variations are within the scope of the invention as described and claimed, whether or not expressly described.

INDUSTRIAL APPLICABILITY

The invention provides improved security for wireless mobile communication devices.

What is claimed is:

1. A method comprising:
   storing first data in a first domain of a wireless communication device, wherein the first data comprises corporate data, and the first domain comprises a corporate domain;
   storing second data in a second domain of the wireless communication device;
   wherein the first domain is managed by an organization and the second domain is managed by a user of the wireless communication device;
   allowing a software application executing on the wireless communication device to provide a unified view of data across multiple domains, the data comprising the first data and the second data, and the multiple domains comprising the first domain and the second domain; and
   providing the unified view of the data across the multiple domains.

2. A method comprising:
   storing first data in a first domain of a wireless communication device;
   storing second data in a second domain of the wireless communication device, wherein the second data comprises personal data, and the second domain comprises a personal domain;
   wherein the first domain is managed by an organization and the second domain is managed by a user of the wireless communication device;
   allowing a software application executing on the wireless communication device to provide a unified view of data across multiple domains, the data comprising the first data and the second data, and the multiple domains comprising the first domain and the second domain; and
   providing the unified view of the data across the multiple domains.

3. A method comprising:
   storing first data in a first domain of a wireless communication device;
   storing second data in a second domain of the wireless communication device, wherein the first data comprises corporate data, and the second data comprises personal data;
   wherein the first domain is managed by an organization and the second domain is managed by a user of the wireless communication device;
   allowing a software application executing on the wireless communication device to provide a unified view of data across multiple domains, the data comprising the first data and the second data, and the multiple domains comprising the first domain and the second domain; and
   providing the unified view of the data across the multiple domains.

4. The method of claim 3, wherein the allowing is based on a policy.

5. The method of claim 3, wherein the first domain comprises a corporate domain, and the second domain comprises a personal domain.

6. The method of claim 3, wherein the multiple domains comprise a third domain.

7. The method of claim 3, wherein the multiple domains comprise a carrier domain.

8. The method of claim 3, wherein the first data comprises data related to one or more contacts of an address book.

9. The method of claim 3, wherein the organization is an employer of the user.

10. The method of claim 3, wherein the organization is an employer of the user and the user of the wireless communication device is an owner of the wireless communication device.

11. A method comprising:
    storing first data in a first domain of a wireless communication device;
    storing second data in a second domain of the wireless communication device;
    wherein the first domain is managed by an organization and the second domain is managed by a user of the wireless communication device, wherein the user of the wireless communication device is an employee of the organization;
    allowing a software application executing on the wireless communication device to provide a unified view of data across multiple domains, the data comprising the first data and the second data, and the multiple domains comprising the first domain and the second domain; and
    providing the unified view of the data across the multiple domains.

12. A method comprising:
    storing first data in a first domain of a wireless communication device;
    storing second data in a second domain of the wireless communication device;
    wherein the first domain is managed by an organization and the second domain is managed by a user of the wireless communication device, wherein the user of the wireless communication device is an owner of the wireless communication device;
    allowing a software application executing on the wireless communication device to provide a unified view of data across multiple domains, the data comprising the first data and the second data, and the multiple domains comprising the first domain and the second domain; and
    providing the unified view of the data across the multiple domains.

13. A method comprising:
    storing first data in a first domain of a wireless communication device;
    storing second data in a second domain of the wireless communication device;
    wherein the first domain is managed by an organization and the second domain is managed by a user of the wireless communication device, wherein the organization is an owner of the wireless communication device;
    allowing a software application executing on the wireless communication device to provide a unified view of data across multiple domains, the data comprising the first data and the second data, and the multiple domains comprising the first domain and the second domain; and providing the unified view of the data across the multiple domains.

14. A method comprising:
storing first data in a first domain of a wireless communication device, wherein the first data comprises corporate data related to one or more contacts of an address book;
storing second data in a second domain of the wireless communication device;
wherein the first domain is managed by an organization and the second domain is managed by a user of the wireless communication device;
allowing a software application executing on the wireless communication device to provide a unified view of data across multiple domains, the data comprising the first data and the second data, and the multiple domains comprising the first domain and the second domain; and
providing the unified view of the data across the multiple domains.

15. A wireless communication device comprising:
a memory configured to:
store first data in a first domain of the wireless communication device, wherein the first data comprises corporate data, and the first domain comprises a corporate domain; and
store second data in a second domain of the wireless communication device,
wherein the first domain is managed by an organization and the second domain is managed by a user of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

16. A wireless communication device comprising:
a memory configured to:
store first data in a first domain of the wireless communication device; and
store second data in a second domain of the wireless communication device, wherein the second data comprises personal data, and the second domain comprises a personal domain,
wherein the first domain is managed by an organization and the second domain is managed by a user of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

17. A wireless communication device comprising:
a memory configured to:
store first data in a first domain of the wireless communication device; and
store second data in a second domain of the wireless communication device,
wherein the first domain is managed by an organization and the second domain is managed by a user of the wireless communication device, wherein the user of the wireless communication device is an employee of the organization or an owner of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

18. A non-transitory computer readable medium, comprising program code executable by a processor such that, when executed, causes a wireless communication device to:
store first data in a first domain of the wireless communication device, wherein the first data comprises corporate data, wherein the first domain comprises a corporate domain;
store second data in a second domain of the wireless communication device;
wherein the first domain is managed by an organization and the second domain is managed by a user of the wireless communication device;
allow a software application executing on the wireless communication device to provide a unified view of data across multiple domains, the data comprising the first data and the second data, and the multiple domains comprising the first domain and the second domain; and
provide the unified view of the data across the multiple domains.

19. A non-transitory computer readable medium, comprising program code executable by a processor such that, when executed, causes a wireless communication device to:
store first data in a first domain of the wireless communication device;
store second data in a second domain of the wireless communication device, wherein the second data comprises personal data, and wherein the second domain comprises a personal domain;
wherein the first domain is managed by an organization and the second domain is managed by a user of the wireless communication device;
allow a software application executing on the wireless communication device to provide a unified view of data across multiple domains, the data comprising the first data and the second data, and the multiple domains comprising the first domain and the second domain; and
provide the unified view of the data across the multiple domains.

20. A non-transitory computer readable medium, comprising program code executable by a processor such that, when executed, causes a wireless communication device to:
store first data in a first domain of the wireless communication device;
store second data in a second domain of the wireless communication device;
wherein the first domain is managed by an organization and the second domain is managed by a user of the wireless communication device, wherein the user of the wireless communication device is an employee of the organization or an owner of the wireless communication device;
allow a software application executing on the wireless communication device to provide a unified view of data across multiple domains, the data comprising the first data and the second data, and the multiple domains comprising the first domain and the second domain; and
provide the unified view of the data across the multiple domains.

21. A non-transitory computer readable medium, comprising program code executable by a processor such that, when executed, causes a wireless communication device to:
store first data in a first domain of the wireless communication device, wherein the first data comprises corporate data related to one or more contacts of an address book;
store second data in a second domain of the wireless communication device;
wherein the first domain is managed by an organization and the second domain is managed by a user of the wireless communication device;
allow a software application executing on the wireless communication device to provide a unified view of data across multiple domains, the data comprising the first data and the second data, and the multiple domains comprising the first domain and the second domain; and
provide the unified view of the data across the multiple domains.

22. A non-transitory computer readable medium, comprising program code executable by a processor such that, when executed, causes a wireless communication device to:
store first data in a first domain of the wireless communication device, wherein the first data comprises corporate data related to one or more calendar events;
store second data in a second domain of the wireless communication device;
wherein the first domain is managed by an organization and the second domain is managed by a user of the wireless communication device;
allow a software application executing on the wireless communication device to provide a unified view of data across multiple domains, the data comprising the first data and the second data, and the multiple domains comprising the first domain and the second domain; and
provide the unified view of the data across the multiple domains.

23. A wireless communication device comprising:
a memory configured to:
store first data in a first domain of the wireless communication device; and
store second data in a second domain of the wireless communication device, wherein the first data comprises corporate data, and the second data comprises personal data,
wherein the first domain is managed by an organization and the second domain is managed by a user of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

24. A wireless communication device comprising:
a memory configured to:
store first data in a first domain of the wireless communication device; and
store second data in a second domain of the wireless communication device,
wherein the first domain is managed by an organization and the second domain is managed by a user of the wireless communication device, wherein the user of the wireless communication device is an owner of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

25. A wireless communication device comprising:
a memory configured to:
store first data in a first domain of the wireless communication device; and
store second data in a second domain of the wireless communication device,
wherein the first domain is managed by an organization and the second domain is managed by a user of the wireless communication device, wherein the organization is an owner of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

26. A wireless communication device comprising:
a memory configured to:
store first data in a first domain of the wireless communication device, wherein the first data comprises corporate data related to one or more contacts of an address book; and
store second data in a second domain of the wireless communication device,
wherein the first domain is managed by an organization and the second domain is managed by a user of the wireless communication device; and
a processor coupled to the memory and configured to:
allow a software application executing on the wireless communication device to provide a unified view of data across multiple domains, the data comprising the first data and the second data, and the multiple domains comprising the first domain and the second domain; and
provide the unified view of the data across the multiple domains.

27. A non-transitory computer readable medium, comprising program code executable by a processor such that, when executed, causes a wireless communication device to:
- store first data in a first domain of the wireless communication device;
- store second data in a second domain of the wireless communication device, wherein the first data comprises corporate data, and the second data comprises personal data, wherein the first domain is managed by an organization and the second domain is managed by a user of the wireless communication device;
- allow a software application executing on the wireless communication device to provide a unified view of data across multiple domains, the data comprising the first data and the second data, and the multiple domains comprising the first domain and the second domain; and
- provide the unified view of the data across the multiple domains.

28. The non-transitory computer readable medium of claim 27, wherein the allowing is based on a policy.

29. A non-transitory computer readable medium, comprising program code executable by a processor such that, when executed, causes a wireless communication device to:
- store first data in a first domain of the wireless communication device;
- store second data in a second domain of the wireless communication device;
  - wherein the organization is an owner of the wireless communication device;
- allow a software application executing on the wireless communication device to provide a unified view of data across multiple domains, the data comprising the first data and the second data, and the multiple domains comprising the first domain and the second domain; and
- provide the unified view of the data across the multiple domains.

* * * * *